US012665764B2

(12) United States Patent
Hopper

(10) Patent No.: US 12,665,764 B2
(45) Date of Patent: Jun. 23, 2026

(54) VERIFICATION SYSTEM FOR OMNICHANNEL END-USER VERIFICATION

(71) Applicant: IDgo, Inc., Tigard, OR (US)

(72) Inventor: Eric Hopper, Happy Valley, OR (US)

(73) Assignee: IDGO, INC., Portland, OR (US)

( * ) Notice: Subject to any disclaimer, the term of this patent is extended or adjusted under 35 U.S.C. 154(b) by 219 days.

(21) Appl. No.: 18/438,680

(22) Filed: Feb. 12, 2024

(65) Prior Publication Data

US 2024/0422540 A1     Dec. 19, 2024

Related U.S. Application Data

(60) Provisional application No. 63/508,474, filed on Jun. 15, 2023.

(51) Int. Cl.
*H04L 9/32*          (2006.01)
*H04L 9/40*          (2022.01)
(52) U.S. Cl.
CPC .......... *H04L 9/3215* (2013.01); *H04L 9/3228* (2013.01); *H04L 63/0838* (2013.01); *H04L 63/18* (2013.01)
(58) Field of Classification Search
CPC ..... H04L 9/3215; H04L 9/3228; H04L 63/18; H04L 63/0838
See application file for complete search history.

(56) References Cited

U.S. PATENT DOCUMENTS

| | | | | |
|---|---|---|---|---|
| 9,002,750 B1* | 4/2015 | Chu | ...................... | H04W 12/04 |
| | | | | 705/72 |
| 9,119,076 B1* | 8/2015 | Gubbi | ................. | H04L 63/0853 |
| 11,165,586 B1* | 11/2021 | Rule | ................... | H04L 63/0807 |
| 2009/0077373 A1* | 3/2009 | Kramer | ................... | H04L 9/321 |
| | | | | 713/176 |
| 2013/0191899 A1* | 7/2013 | Eldefrawy | ............ | H04L 9/3228 |
| | | | | 726/6 |

(Continued)

OTHER PUBLICATIONS

Robinson, Kelley; "What is Silent Network Authentication?" Twilio, www.twilio.com, Aug. 2, 2022, 7 pages.*

(Continued)

*Primary Examiner* — Victor Lesniewski
(74) *Attorney, Agent, or Firm* — Alleman Hall LLP

(57)                    ABSTRACT

Examples are disclosed related to using verification channels for end-user verification. One example provides a method comprising, in a first verification channel, receiving a first verification request and an end-user mobile number from an enterprise computing system, sending a first-time sign-in request to an end-user computing device, and receiving a first end-user authentication message in response to the first-time sign-in request, and in response, associating a passkey with the end-user mobile number. The method further comprises, in a second verification channel, receiving a second verification request and the end-user mobile number from the enterprise computing system, sending a sign-in message, receiving a second end-user authentication message in response to the sign-in message, and in response to receiving a verification approved response from the end-user computing device, sending the verification approved response to the end-user computing device and/or the enterprise computing system.

20 Claims, 10 Drawing Sheets

(56) References Cited

U.S. PATENT DOCUMENTS

| | | | |
|---|---|---|---|
| 2014/0082707 A1* | 3/2014 | Egan ................... | H04L 63/0853 |
| | | | 726/5 |
| 2016/0044022 A1* | 2/2016 | Berkovitz .......... | H04L 63/0815 |
| | | | 726/6 |
| 2016/0219039 A1* | 7/2016 | Houthooft .......... | H04L 63/0815 |
| 2017/0346851 A1* | 11/2017 | Drake .................. | H04L 9/0838 |
| 2021/0243184 A1* | 8/2021 | La Torre .............. | H04L 63/083 |
| 2021/0367954 A1* | 11/2021 | Daga .................. | H04L 63/0838 |
| 2022/0076244 A1* | 3/2022 | Kannan .............. | G06F 16/2379 |
| 2022/0141024 A1* | 5/2022 | Rule ....................... | H04L 67/02 |
| | | | 713/155 |
| 2023/0062507 A1* | 3/2023 | Aabye .................. | H04L 9/3271 |
| 2023/0418923 A1* | 12/2023 | Ogbennah .............. | H04L 67/34 |
| 2024/0303630 A1* | 9/2024 | McHugh et al. .... | G06Q 20/352 |
| 2025/0219839 A1* | 7/2025 | Pearse .................. | H04L 9/3228 |
| 2026/0067270 A1* | 3/2026 | Hegarty ............... | H04L 63/083 |

OTHER PUBLICATIONS

Jin, Weizhao; Ji, Xiaoyu; He, Ruiwen; Zhuang, Zhou; Xu, Wenyuan; Tian, Yuan; "SMS Goes Nuclear: Fortifying SMS-Based MFA in Online Account Ecosystem," 51st Annual IEEE/IFIP International Conference on Dependable Systems and Networks Workshops (DSN-W), Taipei, Taiwan, Jun. 21-24, 2021, IEEE, pp. 7-14.*
Cherif, Asma; Alshehri, Suhair; Kalkatawi, Manal; Imine, Abdessamad; "Towards an intelligent adaptive security framework for preventing and detecting credit card fraud," IEEE/ACS 19th International Conference on Computer Systems and Applications (AICCSA), Abu Dhabi, United Arab Emirates, Dec. 5-8, 2022, IEEE, 8 pgs.*

* cited by examiner

1400

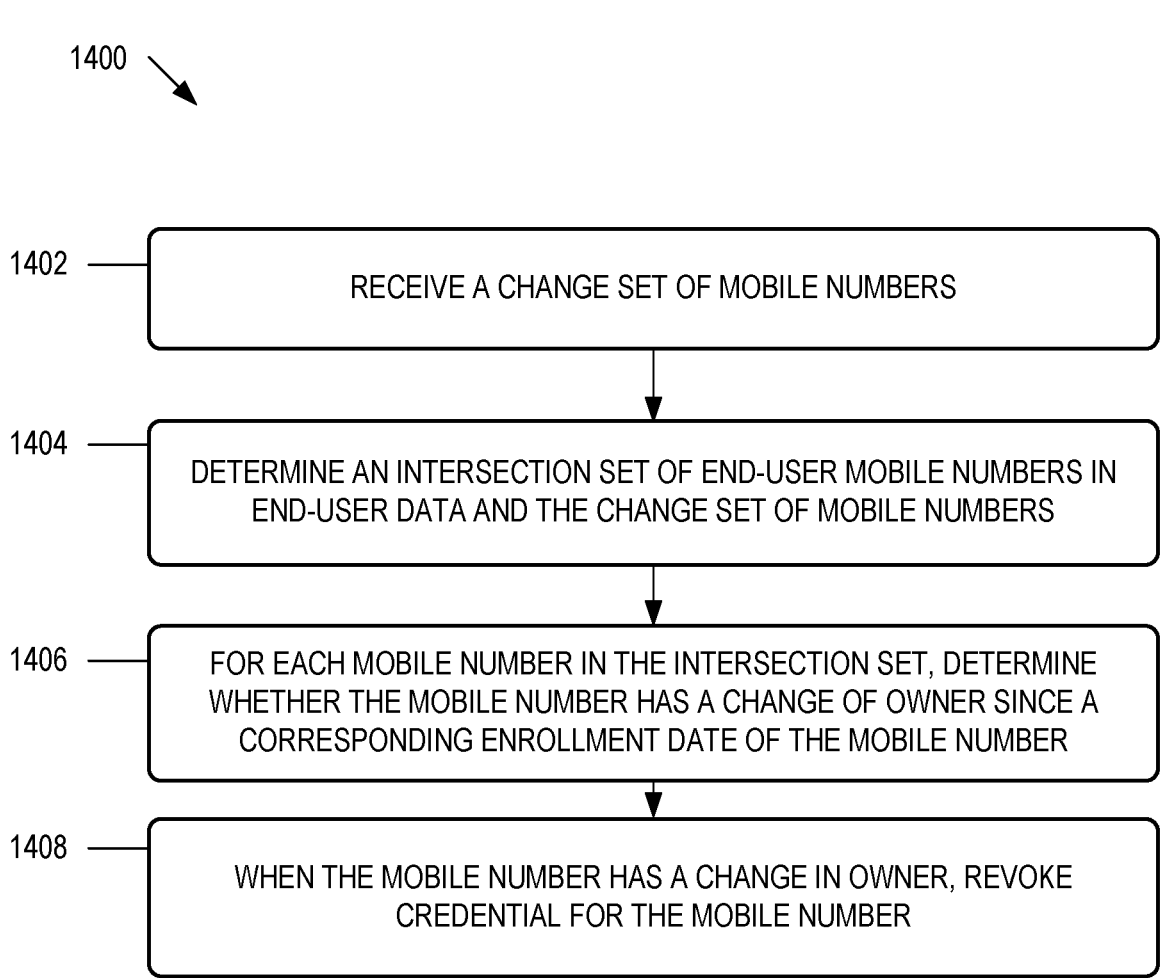

1402 —— RECEIVE A CHANGE SET OF MOBILE NUMBERS

1404 —— DETERMINE AN INTERSECTION SET OF END-USER MOBILE NUMBERS IN END-USER DATA AND THE CHANGE SET OF MOBILE NUMBERS

1406 —— FOR EACH MOBILE NUMBER IN THE INTERSECTION SET, DETERMINE WHETHER THE MOBILE NUMBER HAS A CHANGE OF OWNER SINCE A CORRESPONDING ENROLLMENT DATE OF THE MOBILE NUMBER

1408 —— WHEN THE MOBILE NUMBER HAS A CHANGE IN OWNER, REVOKE CREDENTIAL FOR THE MOBILE NUMBER

FIG. 14

VERIFICATION SYSTEM FOR OMNICHANNEL END-USER VERIFICATION

CROSS REFERENCE TO RELATED APPLICATIONS

The present application is based upon and claims priority under 35 U.S.C. 119(e) to U.S. Provisional Patent Application No. 63/508,474 entitled COMPUTING SYSTEM WITH VERIFICATION AGENT FOR END-USER VERIFICATION TO INHIBIT MAN-IN-THE-MIDDLE ATTACK, filed Jun. 15, 2023, the entirety of which is hereby incorporated herein by reference for all purposes.

BACKGROUND

Many financial institutions use a fraud center to help track and/or prevent fraudulent access to an account of an end-user, such as a customer. Such fraud centers can inform the end-user of detected suspicious activity on their account. One type of fraud that is on the rise is impersonation of fraud center personnel by fraudulent actors, who attempt to gain the trust of users and information necessary to access the users' accounts. This type of attack is referred to a man-in-the-middle attack because the fraudulent actor impersonating the fraud center is positioned in the middle of a communication chain between the user and the financial institution.

SUMMARY

Computing systems and methods are provided for end-user verification to inhibit man-in-the-middle attacks. A method is provided comprising, in a first verification channel including offline channel, receiving a first verification request and an end-user mobile number from an enterprise computing system. The method further comprises sending a first-time sign-in request to an end-user computing device associated with the end-user mobile number, and receiving a first end-user authentication message in response to the first-time sign-in request from the end-user computing device. The first end-user authentication message includes a passkey. The method further comprises, in response, associating the passkey with the end-user mobile number. The method further comprises, in a second verification channel including online channel, receiving a second verification request and the end-user mobile number from the enterprise computing system. The method further comprises sending a sign-in message to the end-user computing device, and receiving a second end-user authentication message in response to the sign-in message from the end-user computing device. The second end-user authentication message includes the passkey. The method further comprises, in response to receiving a verification approved response from the end-user computing device, sending the verification approved response to one or more of the end-user computing device or the enterprise computing system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 14 illustrates a flow diagram of example method for handling recycled mobile numbers.

DETAILED DESCRIPTION

Figure 1:
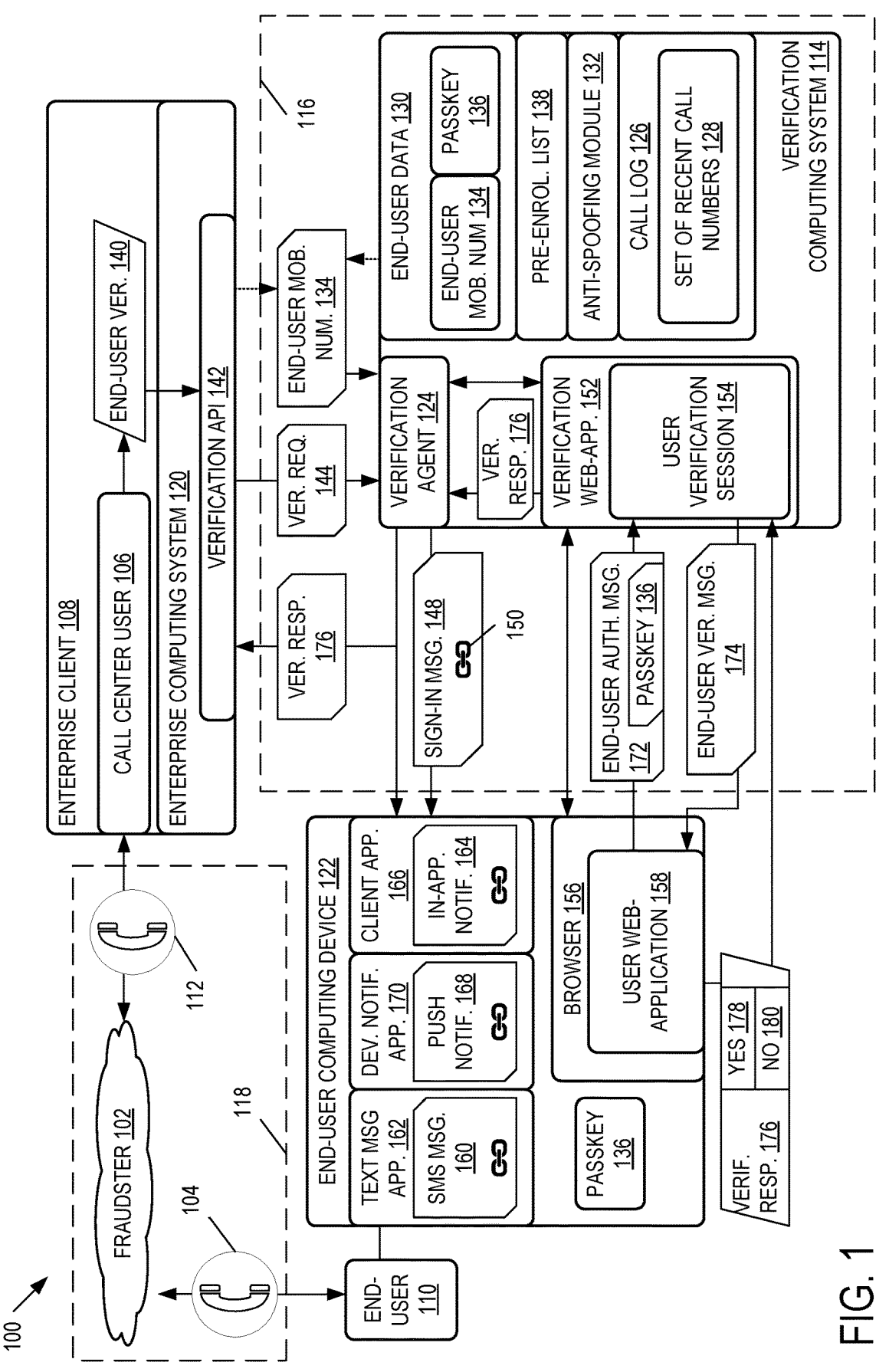
FIG. 1 is a schematic view of an example computing system configured with a verification agent to aid enterprise users such as customer service agents in end-user verification, to reduce the risk of a man-in-the-middle attack scenario.

As mentioned above, a fraud center communicates to an end-user a notification indicating suspicious activity on an account of the end-user. Such notifications may request the end-user to call the fraud center to address the suspicious activity. However, a fraudster may send a fake notification to the end-user pretending to be the fraud center. Such a fake notification may utilize a fake phone number that directs a call to the fraudster instead of the fraud center. When the end-user contacts the fake phone number, the fraudster pretends to be the fraud center. Then, while the fraudster is talking with the end-user, the fraudster calls the fraud center pretending to be the end-user. The fraudster attempting such a man-in-the-middle attack can gain access to account information and control by supplying requested information to the fraud center that the fraudster learns from the end-user. For example, the fraud center might ask for a verification of date of birth or mother's maiden name, for example, and the fraudster would ask the end-user for these pieces of information, and then supply them to the fraud center. Such an attack can be difficult to defend against.

To address this problem, a computing system is disclosed that uses a verification agent to perform end-user verification over various verification channels, such as during a fraud center call, for example. As used herein, the term "verification channel" indicates a digital communication pathway for verifying an end-user, and utilizes one or more authentication protocols. Briefly, a verification computing system receives a verification request to verify an end-user from an enterprise computing system. Then, the verification computing system sends a sign-in message to an end-user computing device. In response to receiving a passkey from the end-user computing device, the verification computing system sends an end-user verification message. The end-user verification message includes information known by the end-user. In some examples, the information is also known at the verification computing system. Alternatively, the verification computing system can send a first-time sign-in request when the end-user computing device is in a pre-enrollment list. The first-time sign-in prompts the end-user computing device to authenticate and send a passkey to the verification computing system before proceeding with the end-user verification message.

After sending the end-user verification message, the verification computing system can receive a verification approved response or a verification failed response from the end-user computing device. Further, the verification computing system can send a possible-fraud message to the end-user computing device and/or the enterprise computing system in response to receiving the verification failed response. In such a manner, an end-user can communicate directly over a verification channel with an enterprise user at the fraud center without going through a fraudster. While the discussed examples are discussed in reference to banking environments, other suitable environments (e.g., healthcare environments, telecommunication environments, e-commerce environments) can use a verification computing system as disclosed herein, in other examples.

FIG. 1 schematically depicts a computing system 100 involved in an example fraud scenario, referred to as a man-in-the-middle attack. In the man-in-the-middle attack, fraudster 102 uses a telephone number 104 to impersonate a call-center user 106 (e.g., customer agent) at an enterprise client 108. The fraudster 102 calls an end-user 110 and impersonates the call-center user 106 to the end-user 110. CallerID information for the telephone number 104 may appear to end-user 110 as if the call from the fraudster 102 is originating from enterprise client 108. The fraudster 102 may attempt to extract information that can be used to gain access to the end-user's 110 account or perform a transaction using the end-user's 110 account, for example. Fraudster 102 further calls a call-center contact number 112 and impersonates the end-user 110 to call-center user 106.

A verification computing system 114 is configured to provide end-user verification over a verification channel 116 that is separate from a communication channel 118 between the fraudster 102 and the call-center contact number 112. More specifically, verification computing system 114 is communicatively coupled to an enterprise computing system 120 at enterprise client 108, and an end-user computing device 122. Verification computing system 114 includes a verification agent 124 configured to perform various verification tasks as discussed in more detail below. Verification computing system 114 further includes a call log 126 having a set of recent call numbers 128. In some examples, the set of recent call numbers 128 includes phone numbers that have called enterprise client 108 in a predetermined time frame such as a prior month, week, day, hour, or other suitable timeframe. In other examples, call log 126 may be omitted. In the depicted example, verification computing system 114 also includes end-user data 130 and an anti-spoofing module 132. End-user data 130 includes various information related to end-user 110, such as name, account information, a mobile number 134, a passkey 136, and/or authorized verification methods, for example. Verification computing system 114 can further include a pre-enrollment list 138 of end-user mobile numbers that are pre-approved for end-user verification with verification agent 124. Anti-spoofing module 132 is configured to determine when a number calling call-center contact number 112 is spoofed. In other examples, end-user data 130, pre-enrollment list 138, and/or anti-spoofing module 132 can be located on a different computing system than verification computing system 114.

In the depicted suspected man-in-the-middle fraud scenario, call-center user 106 initiates an end-user verification 140 using a verification application programming interface (API) 142 on enterprise computing system 120. Specifically, verification agent 124 receives a verification request 144 from verification API 142. Verification agent 124 also receives end-user mobile number 134 from verification API 142, end-user data 130, or another source. Then, verification agent 124 sends a sign-in message 148 to end-user computing device 122 associated with end-user mobile number 134. In some examples, end-user mobile number 134 is in end-user data 130 and therefore, is considered to be enrolled for end-user verification. Alternatively, when an end-user mobile number is not in end-user data 130 and in a pre-enrollment list 138 (e.g., not enrolled), verification agent 124 can send a first-time sign-in request as discussed with reference to FIG. 5.

In FIG. 1, sign-in message 148 includes a hyperlink 150 to a verification web-application 152. The hyperlink 150 is a URL that includes a URL parameter that indicates a verification session state of a user verification session 154 on the verification computing system 114. Selecting the hyperlink 150 can launch a browser 156 on end-user computing device 122, which downloads a user web-application 158 and displays a verification interface to end-user 110 for communication with verification agent 124 in verification channel 116. In some examples, verification agent 124 uses a text message service (e.g., short messaging service SMS) to send sign-in message 148 in a SMS message 160 to a text messaging application 162 on end-user computing device 122. Alternatively, sign-in message 148 can be sent as an in-application notification 164 (e.g., a native application push notification) to an end-user client application 166 on end-user computing device 122. In further examples, verification agent 124 can send sign-in message 148 as a push notification 168 to a device notification application 170, and this push notification may be in the form of a web push notification. Web push notifications are messages that can contain hyperlinks, which users can opt in to receive via a web browser from a website. Verification agent 124 can be configured to compare end-user mobile number 134 to call log 126 before sending sign-in message 148, in some examples. In such examples, when end-user mobile number 134 is in call log 126, verification agent 124 can send a verification confirmed message to verification API 142. Such a configuration can help to verify end-user 110 without requesting input from end-user 110.

End-user computing device 122 further sends an end-user authentication message 172 including passkey 136 to sign-in with user verification session 154. Passkey 136 can include a biometric passkey, a pin number, a password, or another authentication protocol on end-user computing device 122. In some examples, end-user computing device 122 utilizes a "Fast IDentity Online" (FIDO) passkey for FIDO authorization provided by the FIDO ALLIANCE. In some such examples, the FIDO passkey may be leveraged to enroll the end-user mobile number with verification agent 124 for a different enterprise client.

After end-user computing device 122 successfully signs into user verification session 154, verification web-application 152 sends an end-user verification message 174 utilizing a verification interface on user web-application 158 to request an input from end-user 110. Example verification interfaces are discussed with reference to FIGS. 2A and 3. Here, end-user 110 enters a verification response 176 in the verification interface using end-user computing device 122. As depicted, verification response 176 can include a verification approved response 178 ("YES") or a verification failed response 180 ("NO"). Further, verification web-application 152 is configured to send a message including verification response 176 to verification agent 124. Further, verification agent 124 is configured to send verification response 176 to end-user computing device 122 and/or verification API 142. In other examples, verification agent 124 may send another message and/or perform another action in response to receiving verification response 176. While discussed herein with reference to the fraud scenario of a man-in-the-middle attack, verification computing system 114 can be used for end-user verification over other banking channels, such as out-of-the box channels, offline channels (e.g., call center, teller), and online channels (e.g., mobile banking), for example. FIG. 1 is illustrative. In other examples, verification computing system 114 may use another configuration.

Figure 2A:
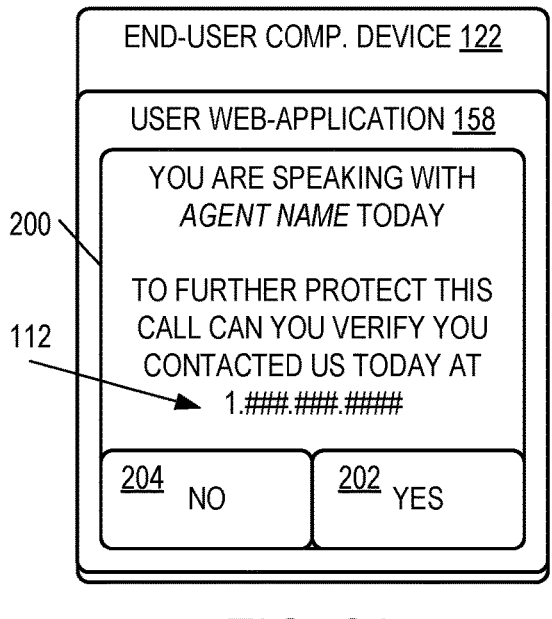
FIGS. 2A, 2B, and 3 schematically depict various example verification interfaces on an end-user computing device of the computing system of FIG. 1.
Figure 2B:
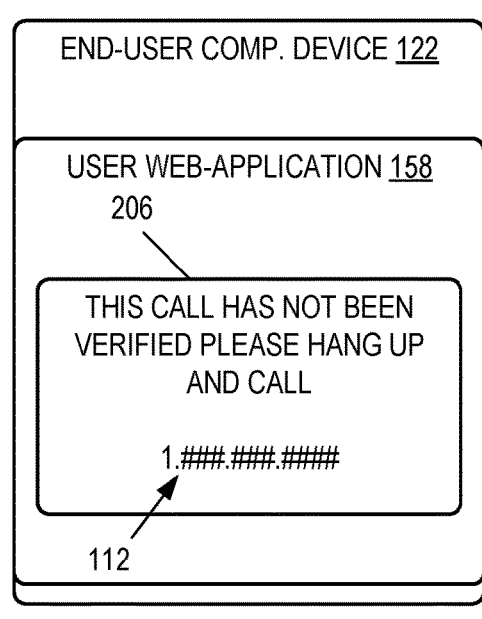
Figure 3:
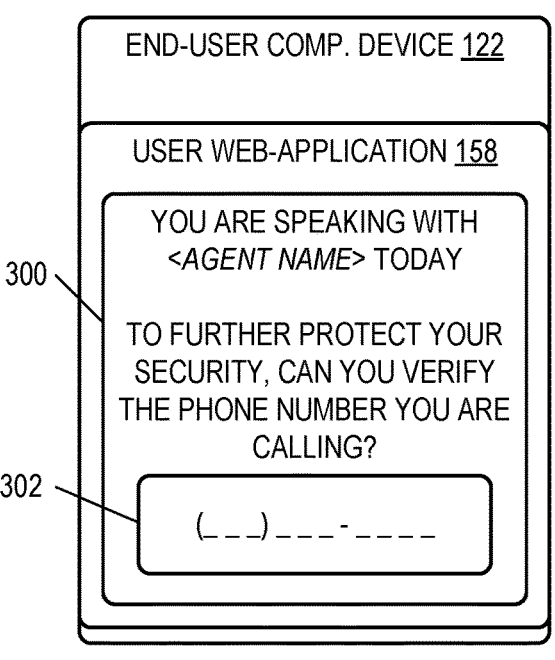

Verification web-application 152 can use various verification interfaces to display content in a message through user web-application 158. FIGS. 2A, 2B, and 3 illustrate such various example verification interfaces. In FIG. 2A, user web-application 158 utilizes a first verification interface 200 to display content downloaded from the verification web-application 152 including an agent name and a query message requesting the user to verify their identity by confirming they are calling a specified call-center contact number (which is the same number that the fraudster has called). Verification interface 200 further includes selectable inputs to indicate an affirmative response 202 (indicating the verification approved response) or a negative response 204 (indicating the verification failed response). In some examples, when negative response 204 is selected and sent to verification computing system 114, end-user computing device 122 can utilize a second verification interface 206 to display a possible-fraud message, as depicted in FIG. 2B. Here, second verification interface 206 presents a request to hang-up and start a new call with call-center contact number 112. In some examples, the second verification interface 206 can be configured to present call-center contact number 112 as a selectable action to initiate a new call. Alternatively, as shown in FIG. 3, a verification interface 300 can display a query for a telephone number that the end-user is currently calling. In this example, the end-user is asked to verify the telephone number the user is calling by inputting the telephone number. Therefore, verification interface 300 includes an input field 302 for a telephone number. FIGS. 2A, 2B, and 3 are illustrative. In other examples other queries and/or verification interfaces may be used.

Figure 4:
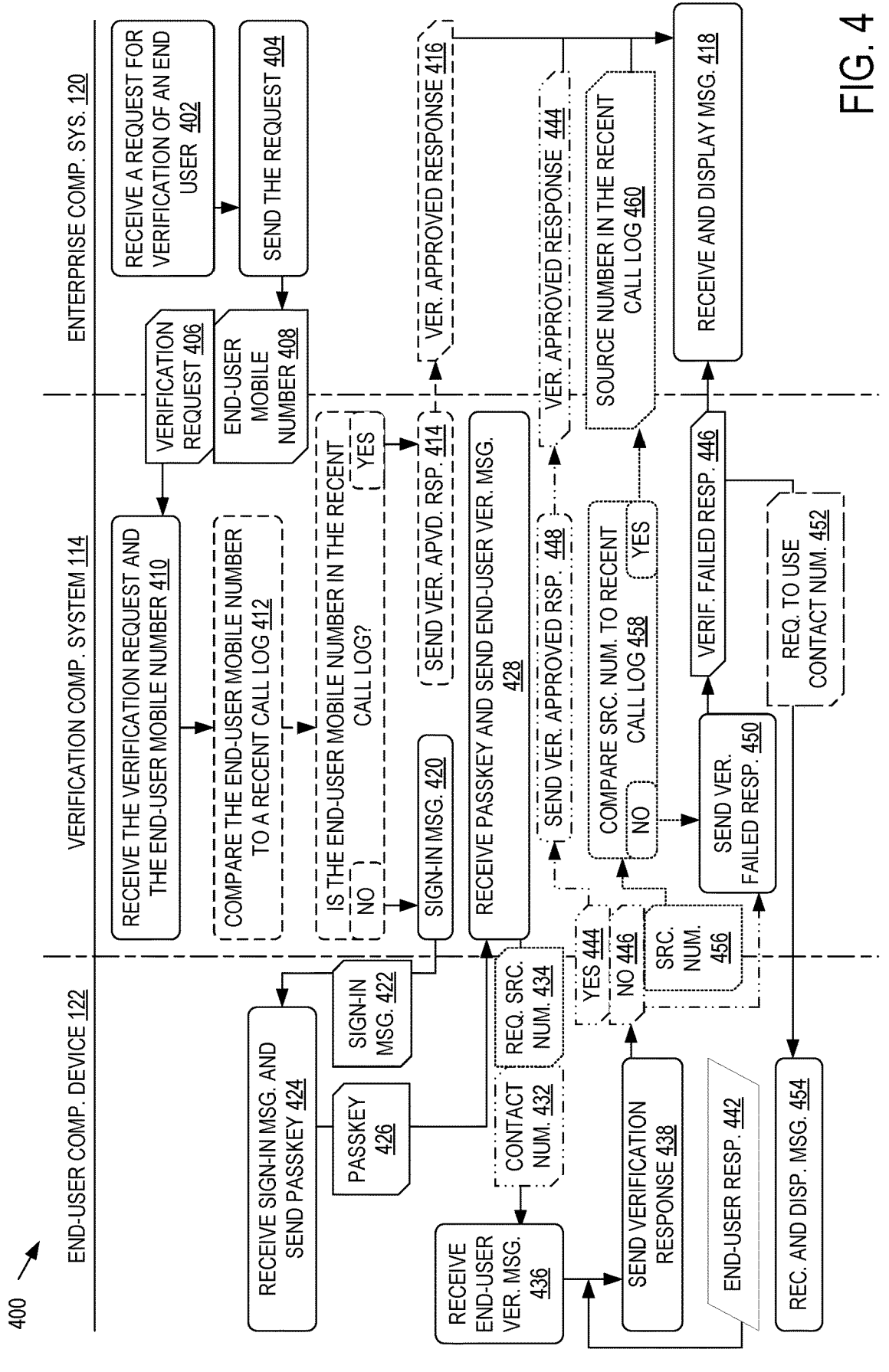
FIG. 4 schematically depicts an example communication flow for the computing system of FIG. 1.

FIG. 4 schematically illustrates an example communication flow 400 used by verification computing system 114 to verify end-user 110 in a verification channel. At enterprise computing system 120, communication flow 400 includes receiving, at 402, a request for a verification of an end-user, and sending, at 404, the request to verification computing system 114. As shown, the request includes a verification request 406 and an end-user mobile number 408. In other examples, the verification request can include other suitable information.

At verification computing system 114, communication flow 400 includes receiving the request at 410. Further, communication flow 400 optionally includes comparing the end-user mobile number 408 to a recent call log at 412. The recent call log 412 includes a set of numbers that have recently called a call-center contact number. When the end-user mobile number 408 is in the recent call log, communication flow 400 moves to sending, at 414, a verification approved response 416 to enterprise computing system 120. Communication flow 400 further includes, at 418, receiving and displaying a message at enterprise computing system 120. Here, the message is verification approved response 416. In other examples, 412 and/or 414 may be omitted.

Returning to verification computing system 114, communication flow 400 further includes, at 420, sending a sign-in message 422 to end-user computing device 122. In some examples, the sign-in message can include a hyperlink to a verification web-application. When the hyperlink is selected, it causes a browser on the end-user computing device 122 to download a verification interface from the verification web-application at the verification computing system 114. The sign-in message 422 can be sent using a text messaging service (e.g., SMS), a notification within a client application on end-user computing device 122, a push notification from a verification agent on verification computing system 114, or in another manner. In some examples, the sign-in message 422 is sent when the end-user mobile number 408 is not in the recent call log. At end-user computing device 122, communication flow 400 includes receiving, at 424, the sign-in message and sending a passkey 426 to verification computing system 114. In such a manner, end-user computing device 122 can successfully sign into a user session of the verification web-application. Upon receiving the passkey 426 at verification computing system 114, communication flow 400 includes sending, at 428, an end-user verification message. The end-user verification message can include a call-center contact number 432 or a request for a source number 434 (e.g., the phone number used to contact the fraud center).

At end-user computing device 122, communication flow 400 includes receiving, at 436, the end-user verification message and sending, at 438, a verification response to verification computing system 114. In some examples, the end-user verification is received in the verification interface from the verification web-application. In such examples, the end-user verification response indicates an end-user response 442. As depicted, the verification response can include a verification approved response 444 ("YES") or a verification failed response 446 ("NO").

Returning to verification computing system 114, communication flow 400 includes sending verification approved response 444 for display to enterprise computing system 120, at 448. Here, communication flow 400 moves to 418 and the message is verification approved response 444. In other examples when the verification response includes verification failed response 446, communication flow 400 includes sending the verification failed response 446 to end-user computing device 122 and/or enterprise computing system 120 at 450. In some examples, a possible-fraud message including a request to use the fraud-center contact number can also be sent to end-user computing device 122, as indicated at 452. In such examples, communication flow 400 includes, at end-user computing device 122, receiving and displaying the possible-fraud message at 454, such as by using the verification interface of the user web-application on end-user computing device 122, for example.

In examples where the end-user verification message includes a request for source number 434, the verification response can include a source number 456. In such examples, communication flow 400 includes comparing source number 456 to the recent call log at 458. When source number 456 is in the call log, communication flow 400 moves to 418 and the message indicates that source number 456 is in the call log, as indicated at 460. Alternatively, when source number 456 is not in the call log, communication flow 400 moves to sending, at 450, verification failed response 446 and/or the possible-fraud message. Communication flow 400 is illustrative. In other examples, one or more actions shown may be omitted.

Figure 5:
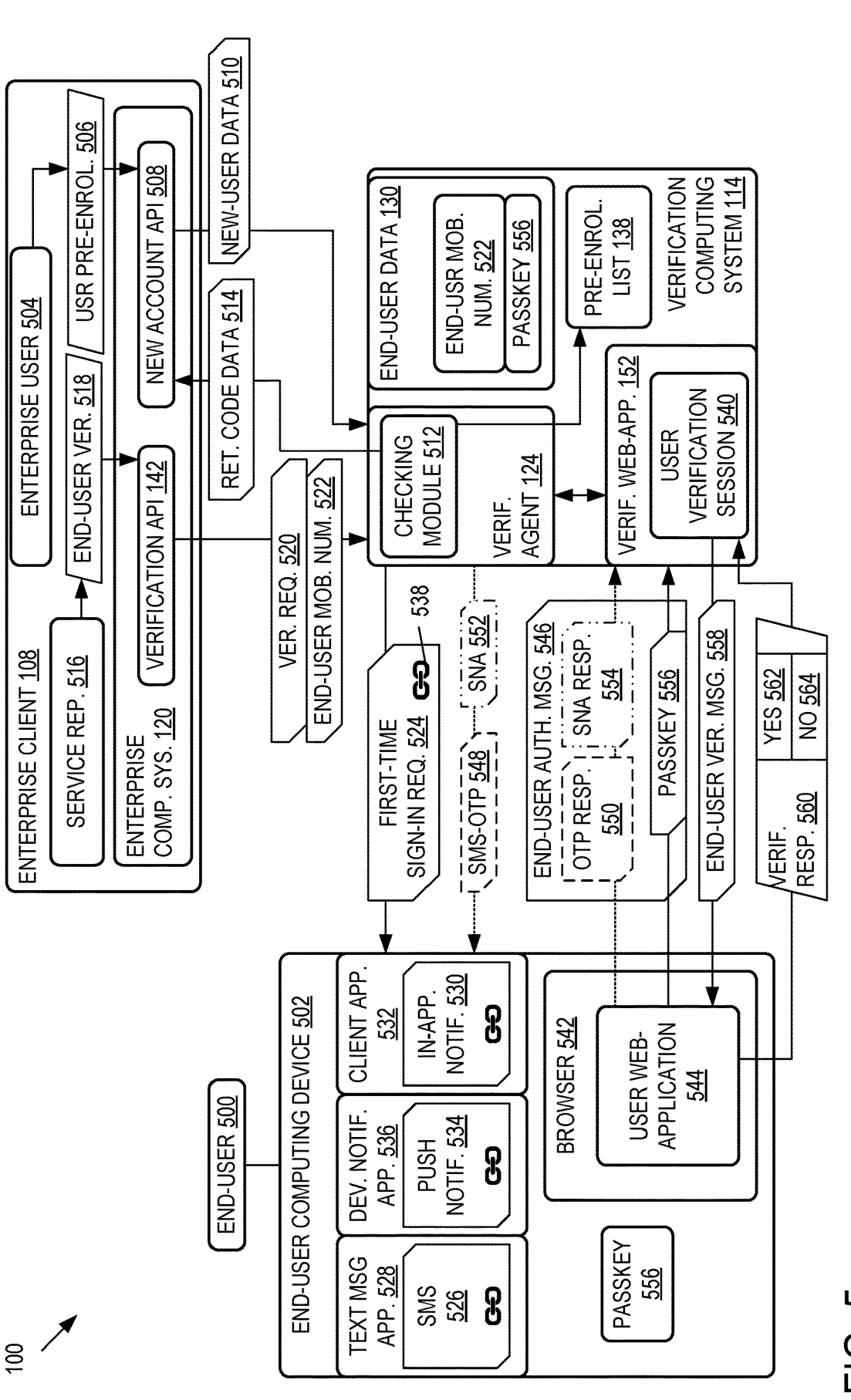
FIG. 5 schematically depicts the verification agent of FIG. 1 engaged in an example pre-enrollment scenario.
Figure 6:
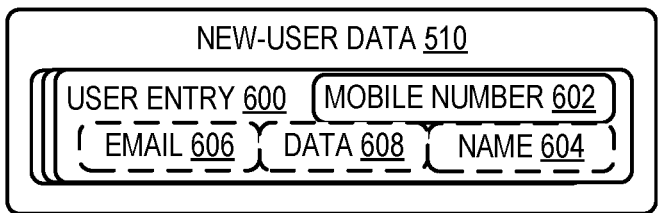
FIGS. 6, 7A, and 7B schematically depict example new-user data and corresponding return-code data for the pre-enrollment scenario of FIG. 5.

As previously mentioned, an end-user mobile number can be pre-approved for end-user verification with verification agent 124. FIG. 5 schematically depicts computing system 100 involved in an example pre-approved scenario for a new end-user, referred to as pre-enrollment. Here, enterprise client 108 can request to add a list of specified end-user mobile numbers to pre-enrollment list 138 such that an end-user 500 can be verified without prior enrollment of an end-user computing device 502. In the example pre-enrollment scenario, an enterprise user 504 at enterprise client 108 initiates a user pre-enrollment 506 using a new account API 508 on enterprise computing system 120. More particularly, verification agent 124 receives new-user data 510 from enterprise computing system 120. New-user data 510 includes a list of user entries that are approved for pre-enrollment, as schematically depicted in FIG. 6. Each user entry 600 includes a mobile number 602 and optionally one or more of a name 604, an email address 606, or other relevant data 608, such as an account number or an address, for example.

Figure 7A:
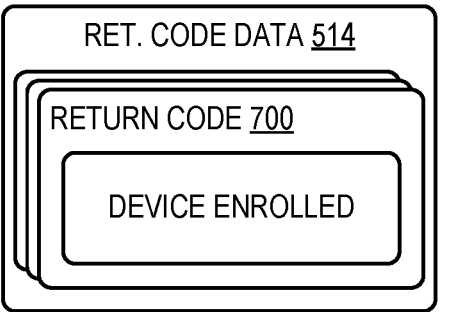
Figure 7B:
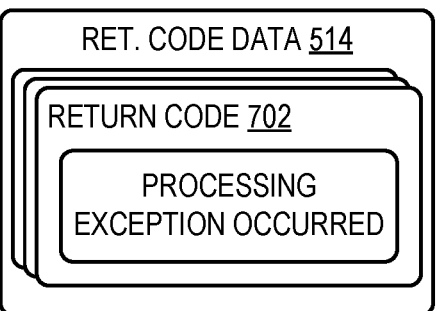

Returning to FIG. 5, verification agent 124 can include a checking module 512 configured to perform one or more checks on new-user data 510. As one example, checking module 512 can determine whether mobile number 602 is a mobile number and not already in end-user data 130, and can further generate a return-code indicating a result of the determination. In such a manner, verification agent 124 can send corresponding return-code data 514 for new-user data 510 to enterprise computing system 120. An example return code 700 from return-code data 514 is schematically depicted in FIG. 7A. In the depicted example, return code 700 indicates successful enrollment of user entry 600. Alternatively, an example return code 702 can indicate a processing error for a user entry in new-user data 510, as schematically depicted in FIG. 7B. In other examples, a return code can indicate another suitable result from checking module 512. In FIG. 5, verification agent 124 stores mobile number 602 as a mobile number in pre-enrollment list 138 based at least upon a return code indicating successful enrollment. In such a manner, end-user computing device 502 is pre-enrolled with verification agent 124. Further, such pre-enrollment can enable a service representative 516 at enterprise client 108 to initiate an end-user verification 518 without a prior request to enroll end-user computing device 502.

In the example of FIG. 5, enterprise computing system 120 sends a verification request 520 and an end-user mobile number 522 associated with end-user computing device 502 to verification agent 124 in response to service representative 516 initiating end-user verification 518. Upon determining that end-user mobile number 522 is in pre-enrollment list 138, verification agent 124 is configured to send a first-time sign-in request 524 to end-user computing device 502. In various examples, first-time sign-in request 524 can be sent as a SMS message 526 using a text messaging application 528, an in-application notification 530 within an end-user client application 532, or a push notification 534 through a device notification application 536 similar to sign-in message 148. In other examples, first-time sign-in request 524 can be sent in another suitable manner.

Figure 8:
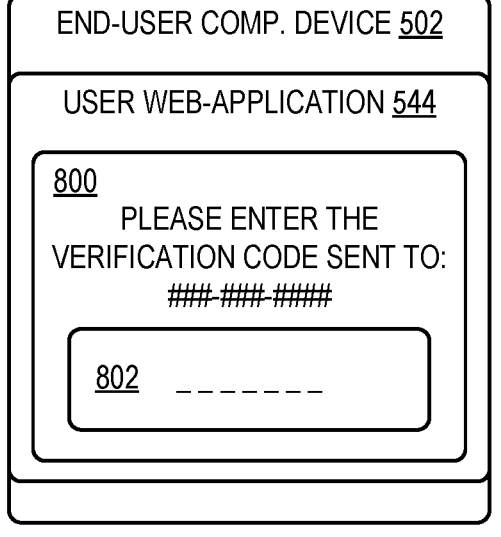
FIGS. 8 and 9 schematically depict various example verification interfaces on an end-user computing device used in the pre-enrollment scenario of FIG. 5.

As depicted, first-time sign-in request 524 includes a hyperlink 538 to verification web-application 152. Similar to hyperlink 150, hyperlink 538 is a URL that includes a URL parameter that indicates a verification session state of a user verification session 540 on verification computing system 114. Further, upon selecting hyperlink 538, a browser 542 on end-user computing device 502 downloads a user web-application 544 and displays a verification interface to end-user 500 for communication with user verification session 540. Verification web-application 152 is configured to authenticate end-user computing device 502 using user web-application 544 based at least upon detecting a connection with end-user computing device 502. In response, end-user computing device 502 is configured to send an end-user authentication message 546 to verification computing system 114. More specifically, verification web-application 152 can send a SMS-one-time-passcode (SMS-OTP) 548 using text messaging application 528. Further, verification web-application 152 can utilize user web-application 544 to request an OTP response 550 from end-user 500. An example verification interface 800 including an input field 802 for an OTP is schematically illustrated in FIG. 8. In such examples, the OTP received from input field 802 is OTP response 550. Alternatively, verification web-application 152 can send a silent network authorization (SNA) request 552 to end-user computing device 502. In such examples, user web-application 544 includes a SNA response 554 to SNA request 552 in end-user authentication message 546. Using SNA request 552 enables verification web-application 152 to authenticate end-user computing device 502 without requesting an input for an OTP from end-user 500.

Additionally, user web-application 544 is configured to generate and include a passkey 556 in end-user authentication message 546. After receiving end-user authentication message 546, verification agent 124 is configured to associate passkey 556 with end-user mobile number 522 in end-user data 130. In such a manner, end-user computing device 502 is enrolled with verification agent 124. This enables verification agent 124 to verify an end-user computing device over various verification channels as discussed with reference to FIG. 13. Additionally, this can also help enterprise client 108 to increase adoption of verification web-application 152 from end-users compared to using an end-user opt in manner. In some examples, verification computing system 114 may determine whether the end-user mobile number has had a SIM card swap in a predetermined time frame such as a prior week, day, hour, or other suitable timeframe. A SIM card swap can occur when a user newly acquires a recycled mobile telephone number that was previously used by a different user. To avoid a situation where a new user of the mobile number is mistaken by the system as being the previous user of the mobile number, when a SIM card swap has been determined, verification computing system 114 is configured to deny enrollment of end-user computing device 502 with verification agent 124.

Continuing in FIG. 5, after receiving end-user authentication message 546, verification agent 124 is configured to send an end-user verification message 558 to end-user computing device 502 using user web-application 544. End-user verification message 558 includes content for display in the verification interface of user web-application 544. Here, end-user 500 enters a verification response 560 in the verification interface using end-user computing device

Figure 9:
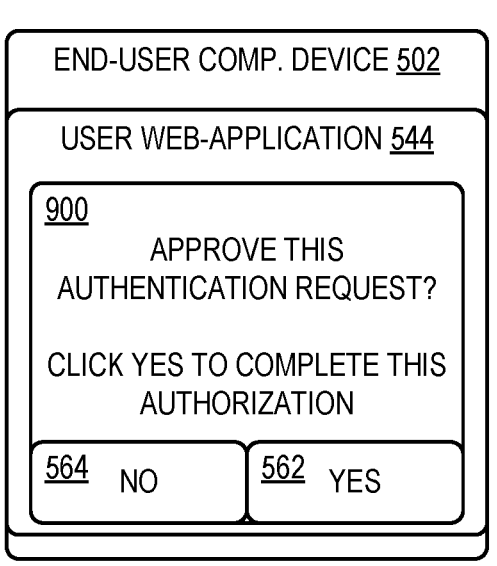

502. As depicted, verification response 560 can include a verification approved response 562 ("YES") or a verification failed response 564 ("NO"). More particularly, FIG. 9 illustrates an example verification interface 900 including selectable inputs to indicate verification approved response 562 ("YES") or verification failed response 564 ("NO"). In FIG. 5, verification web-application 152 is configured to send verification response 560 to one or more of end-user computing device 502 or enterprise computing system 120 in some examples, as previously discussed. FIGS. 5, 6, 7A, 7B, 8, and 9 are illustrative. In other examples, user web-application 544 can use other verification interfaces. In further examples, verification computing system 114 may use another configuration.

Figure 10:
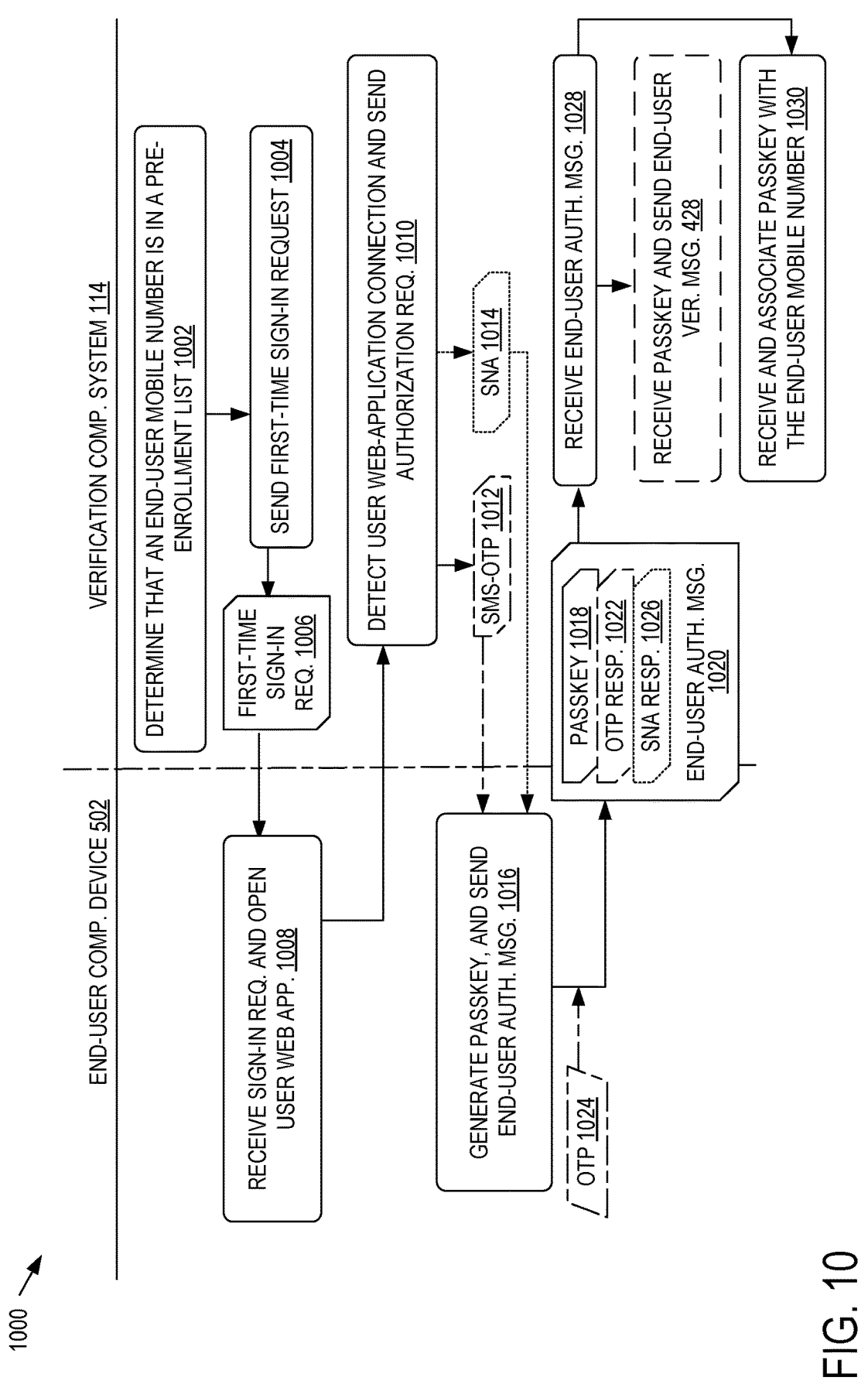
FIG. 10 schematically depicts an example communication flow for end-user verification of a pre-enrolled device for the communication system of FIG. 5.

FIG. 10 schematically illustrates an example communication flow 1000 used by verification computing system 114 for verifying an end-user during a pre-enrollment scenario. Here, verification computing system 114 receives a request for a user verification and an end-user mobile number as discussed above. Alternatively, verification computing system 114 can receive a request for enrollment from the end-user (e.g., by the end-user selecting an input for enrollment on end-user computing device 502), in a so-called "self serve" mode of enrollment. At verification computing system 114, upon determining, at 1002, that the end-user mobile number is in pre-enrollment list 138, communication flow 1000 moves to sending, at 1004, a first-time sign-in request 1006 to end-user computing device 502. At end-user computing device 502, communication flow 1000 includes receiving, at 1008, first-time sign-in request 1006 and opening a user web-application.

Returning to verification computing system 114, communication flow 1000 includes detecting, at 1010, a user web-application connection and sending an authorization request to end-user computing device 502. In some examples, the authorization request includes an SMS OTP request 1012. Alternatively, the authorization request can include a SNA request 1014. In response to receiving the authorization request at end-user computing device 502, communication flow 1000 further includes generating, at 1016, a passkey 1018, and sending an end-user authentication message 1020 including passkey 1018 to verification computing system 114. In the examples where SMS OTP request 1012 was sent, end-user authentication message 1020 includes an OTP response 1022 indicating an end-user OTP response 1024, such as entered into a verification interface on end-user computing device 502, for example. Alternatively, in examples where SNA request 1014 was sent, end-user authentication message 1020 includes a SNA response 1026. In such a configuration, end-user computing device 502 can be authenticated without requesting input from the user of end-user computing device 502.

At verification computing system 114, communication flow 1000 includes receiving, at 1028, end-user authentication message 1020 and moves to receiving, at 428, the passkey and sending an end-user verification message in FIG. 4. In examples where a request for enrollment is received from the end-user, communication flow 1000 moves to receiving and associating the passkey with the end-user mobile number at 1030. In such a manner, communication flow 1000 can enable user verification and authentication of a new-user. FIG. 10 is illustrative. In other examples, another communication flow may be used.

Figures 11, 12:
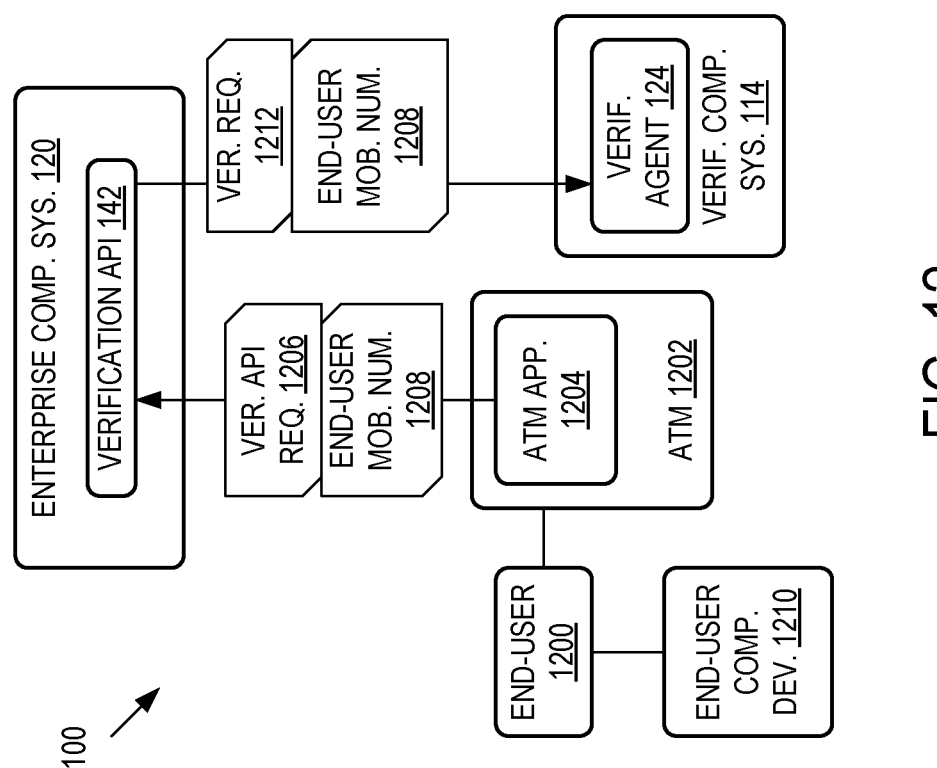
FIGS. 11 and 12 schematically depict the computing system of FIG. 1 engaged in end-user verification initiated by various applications.

In the above examples, a user at enterprise client 108 (e.g., call-center user 106 or service representative 516) initiates the end-user verification in a verification channel including an offline channel, such as communication between an end-user and the user at the enterprise client 108, for example. In other examples, an application can also initiate an end-user verification by sending an API call to verification API 30 in a verification channel including an online channel. FIGS. 11 and 12 schematically depict computing system 100 involved in various example end-user verifications in verification channels including online channels. For clarity, FIGS. 11 and 12 depict a reduced set of components of computing system 100 and it will be understood that disclosed components of verification computing system 114 can help with the example end-user verifications depicted.

In FIG. 11, an end-user 1100 is conducting mobile banking on an end-user computing device 1102. Here, end-user 1100 is using a mobile banking application 1104 that is operatively coupled to a back-end computing system 1106. More specifically, end-user 1100 performs a banking transaction that requests end-user verification in mobile banking application 1104. As such, back-end computing system 1106 is configured to send a verification API request 1108 and an end-user mobile number 1110 associated with end-user computing device 1102 to verification API 142 on enterprise computing system 120. In response, verification API 142 is configured to send a verification request 1112 and end-user mobile number 1110 to verification agent 124 on verification computing system 114 to perform the end-user verification as previously discussed.

Next, in FIG. 12 an end-user 1200 is performing a banking transaction at an automated teller machine (ATM) 1202 operatively coupled to enterprise computing system 120. Here, an ATM application 1204 on ATM 1202 requests a user verification to continue the transaction. Therefore, ATM application 1204 is configured to send to verification API 142 a verification API request 1206 and an end-user mobile number 1208 associated with an end-user computing device 1210 of end-user 1200. In some examples, ATM application 1204 may request an input from end-user 1200 for end-user mobile number 1208. After receiving verification API request 1206, verification API 142 is configured to send a verification request 1212 and end-user mobile number 1208 to verification agent 124 on verification computing system 114 for the end-user verification as previously discussed. FIGS. 11 and 12 are illustrative.

Figure 13:
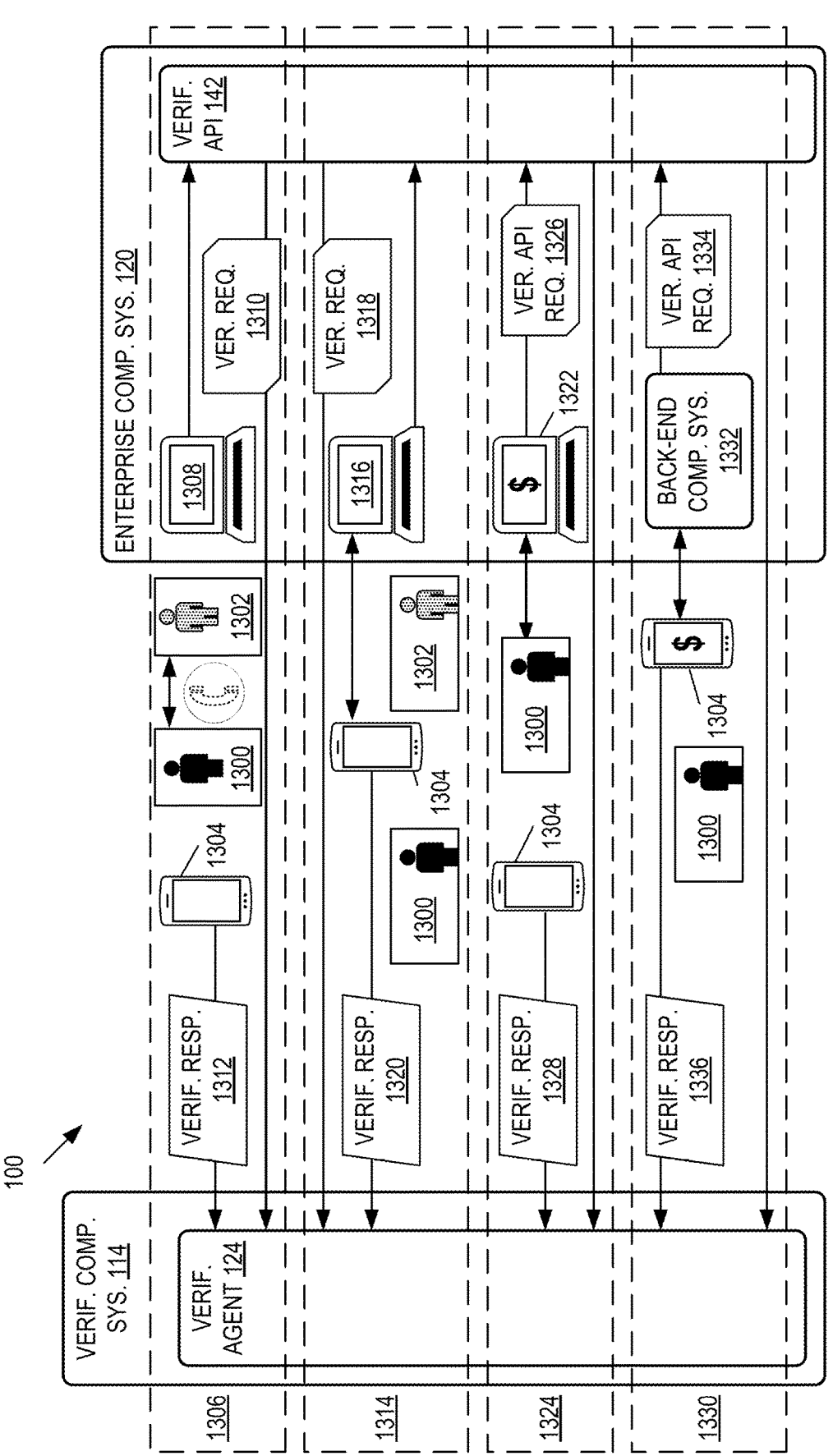
FIG. 13 schematically depicts the computing system of FIG. 1 engaged in an example omnichannel end-user verification.

In the above examples, an end-user verification is performed over one verification channel. In other examples, verification computing system 114 can engage in multiple end-user verifications over various verification channels for an end-user, referred to herein as "omnichannel end-user verification" using the same passkey for verification by the verification API from different computing devices over the different channels. FIG. 13 schematically depicts computing system 100 engaged in an example omnichannel end-user verification of an end-user 1300. In the depicted omnichannel end-user verification example, end-user 1300 engages in multiple banking transactions that prompt end-user verifications. Briefly, end-user 1300 interacts with a service representative 1302 and/or banking applications over different verification channels. In each verification channel, verification agent 124 communicates with verification API 142 and an end-user computing device 1304 using the user's passkey as discussed above.

In some examples, end-user 1300 is engaged in communication with service representative 1302 over an offline channel to perform a banking transaction (e.g., person-to-person communication or person-to-integrated voice response system communication via a telephone call). More specifically, in a first verification channel 1306, end-user 1300 is using the offline channel to communicate with service representative 1302. The offline channel can be over a contact number or in-person at a branch office. Here, end-user computing device 1304 is pre-enrolled (e.g., in pre-enrolled list 138). During the transaction, service representative 1302 initiates a first end-user verification using a computing device 1308 operatively coupled to verification API 142. In response, verification API 142 sends a first verification request 1310 to verification agent 124 resulting in a first verification response 1312 including the user's passkey from end-user computing device 1304 as previously discussed. Further, during the first end-user verification, end-user computing device 1304 becomes enrolled with verification agent 124 as discussed with reference to FIGS. 5 and 10.

Next, in a second verification channel 1314, end-user 1300 is using end-user computing device 1304 for remote person-to-person communication with service representative 1302 on computing device 1316 for a second banking transaction. Such an offline channel can include video banking sessions, online banking chat sessions with a human agent, interactive teller machine (ITM) sessions, or other remote banking sessions with a human agent. During the second banking transaction, service representative 1302 initiates a second end-user verification and in response, verification API 142 sends a second verification request 1318 to verification agent 124 resulting in a second verification response 1320 including the user's passkey from end-user computing device 1304. Further, in second verification channel 1314, end-user computing device 1304 is registered in user data on verification computing system 114 and therefore, the second end-user verification is performed as discussed with reference to FIGS. 1 and 4.

Alternatively or additionally, end-user 1300 can engage with a banking application over an online channel. More specifically, end-user 1300 is engaged in a digital banking transaction with an ATM 1322 on enterprise computing system 120 in a third verification channel 1324. During the digital banking transaction, ATM 1322 sends a first verification API request 1326 to verification API 142 for a third end-user verification resulting in a third verification response 1328 from end-user computing device 1304 with the user's passkey as discussed with reference to FIG. 12. Next, in a fourth verification channel 1330, end-user 1300 is engaged in a mobile banking session using a mobile banking application operatively coupled to a back-end computing system 1332. During the mobile banking session, back-end computing system 1332 initiates a fourth end-user verification by sending a second verification API request 1334 to verification API 142, and resulting in a fourth verification response 1336 including the user's passkey from end-user computing device 1304 as discussed with reference to FIG. 11.

In such a manner, verification computing system 114 can verify the same end-user (e.g., end-user 1300) and same user passkey over various verification channels including offline channels and/or online channels. In other examples, verification computing system 114 can engage in an end-user verification in another verification channel, such as in verification channels including artificial intelligence (AI) chat environments, online account openings, or online loan applications, for example. FIG. 13 is illustrative. In other examples, one or more depicted components may be omitted. While discussed with reference to a banking environment, verification computing system 114 can be used in other suitable environments, such as healthcare environments, telecommunication environments, e-commerce environments, for example.

Mobile numbers tend to operate on a mobile carrier network. End-users may take their mobile number from one mobile carrier to another mobile carrier. Alternatively, an end-user may altogether stop using a mobile number. In the latter case, the mobile carrier may change an owner of the mobile number to a new end-user (referred to as mobile number recycling). Such mobile number recycling may pose problems for a verification computing system, such as verification computing system 114, for example. FIG. 14 illustrates a flowchart of an example method 1400 for handling recycled mobile numbers. Method 1400 can be performed by any suitable component of verification computing system 114, such as verification agent 124. Method 1400 comprises, at 1402, receiving a change set of mobile numbers. The change set of mobile numbers can indicate mobile numbers that are no longer used by a specified carrier. For example, a mobile number may be moved from one mobile carrier to another mobile carrier. Alternatively, a mobile number may no longer be in use, and therefore may be recycled (e.g., assigned to a new end-user). Method 1400 comprises, at 1404, determining an intersection set of end-user mobile numbers in end-user data on the verification computing system (e.g., end-user data 130) and the change set of mobile numbers. For example, the intersection set of end-user mobile numbers indicate mobile numbers that are registered with verification agent 124 and may be recycled by the mobile carrier. Additionally, method 1400 comprises, at 1406, for each mobile number in the intersection set, determining whether the mobile number has a change of owner since a corresponding enrollment date of the mobile number. The corresponding enrollment date reflects the date the mobile number was previously enrolled with verification agent 124. In some examples, the determination can be made by sending a query to a service that provides such change of owner information for mobile numbers. When the mobile number has a change in owner, method 1400 revokes credential for the mobile number as indicated at 1408. In such a manner, a recycled mobile number can be associated with the new owner of the mobile number during a subsequent enrollment of the mobile number.

A verification computing system as disclosed herein, helps to enable a common verification solution bridging offline and online verification channels. Such omnichannel credentials may help to streamline user experiences for an end-user of an enterprise client. Additionally, pre-enrollment may reduce overhead of enrolling end-users compared to an end-user opt-in manner, and may help an enterprise client to enroll end-users with the disclosed omnichannel end-user verification utilizing the verification computing system.

In some embodiments, the methods and processes described herein may be tied to a computing system of one or more computing devices. In particular, such methods and processes may be implemented as a computer-application program or service, an application-programming interface (API), a library, and/or other computer-program product.

Figure 15:
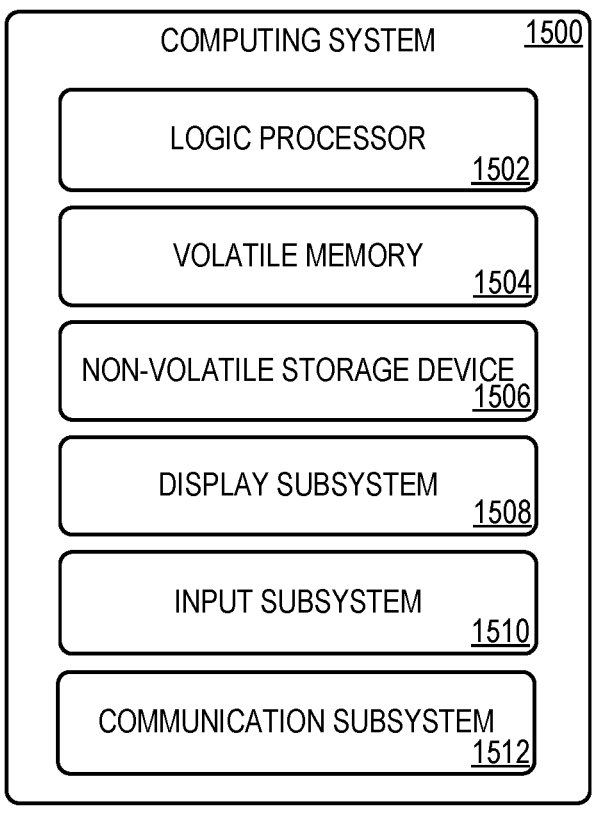
FIG. 15 shows a block diagram of an example computing environment that may be used to implement the computing system of FIG. 1.

FIG. 15 schematically shows a non-limiting embodiment of a computing system 1500 that can enact one or more of the methods and processes described above. Computing system 1500 is shown in simplified form. Computing system 1500 may embody the verification computing system 114 described above and illustrated in FIG. 1. Components of computing system 1500 may be included in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 1500 includes a logic processor 1502 volatile memory 1504, and a non-volatile storage device 1506. Computing system 1500 may optionally include a display subsystem 1508, input subsystem 1510, communication subsystem 1512, and/or other components not shown in FIG. 15.

Logic processor 1502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the logic processor 1502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1506 includes one or more physical devices configured to hold instructions executable by the logic processors to implement the methods and processes described herein. When such methods and processes are implemented, the state of non-volatile storage device 1506 may be transformed—e.g., to hold different data.

Non-volatile storage device 1506 may include physical devices that are removable and/or built in. Non-volatile storage device 1506 may include optical memory, semiconductor memory, and/or magnetic memory, or other mass storage device technology. Non-volatile storage device 1506 may include nonvolatile, dynamic, static, read/write, read-only, sequential-access, location-addressable, file-addressable, and/or content-addressable devices. It will be appreciated that non-volatile storage device 1506 is configured to hold instructions even when power is cut to the non-volatile storage device 1506.

Volatile memory 1504 may include physical devices that include random access memory. Volatile memory 1504 is typically utilized by logic processor 1502 to temporarily store information during processing of software instructions. It will be appreciated that volatile memory 1504 typically does not continue to store instructions when power is cut to the volatile memory 1504.

Aspects of logic processor 1502, volatile memory 1504, and non-volatile storage device 1506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1500 typically implemented in software by a processor to perform a particular function using portions of volatile memory, which function involves transformative processing that specially configures the processor to perform the function. Thus, a module, program, or engine may be instantiated via logic processor 1502 executing instructions held by non-volatile storage device 1506, using portions of volatile memory 1504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1508 may be used to present a visual representation of data held by non-volatile storage device 1506. The visual representation may take the form of a graphical user interface (GUI). As the herein described methods and processes change the data held by the non-volatile storage device, and thus transform the state of the non-volatile storage device, the state of display subsystem 1508 may likewise be transformed to visually represent changes in the underlying data. Display subsystem 1508 may include one or more display devices utilizing virtually any type of technology. Such display devices may be combined with logic processor 1502, volatile memory 1504, and/or non-volatile storage device 1506 in a shared enclosure, or such display devices may be peripheral display devices.

When included, input subsystem 1510 may comprise or interface with one or more user-input devices such as a keyboard, mouse, touch screen, camera, or microphone.

When included, communication subsystem 1512 may be configured to communicatively couple various computing devices described herein with each other, and with other devices. Communication subsystem 1512 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 1500 to send and/or receive messages to and/or from other devices via a network such as the Internet.

"And/or" as used herein is defined as the inclusive or V, as specified by the following truth table:

| A | B | A ∨ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method on a verification computing system comprising a verification agent and a verification web-application, the method comprising:

in a first verification channel including an offline channel in which a verification API (application programing interface) sends a first verification request in response to an input initiating an end-user verification on a first computing device of an enterprise computing system:

receiving the first verification request and an end-user mobile number from the verification API;

sending a first-time sign-in request to an end-user computing device associated with the end-user mobile number, the first-time sign-in request indicating a state of a first user verification session in the verification web-application on the verification computing system, the first user verification session being in communication with the verification agent and a first user web-application on the end-user computing device;

receiving, from the first user web-application, a first end-user authentication message after detecting a connection with the end-user computing device, the first end-user authentication message including a passkey, and in response, associating the passkey with the end-user mobile number;

in a second verification channel including an online channel in which the verification API sends a second verification request in response to a verification API request from a second computing device of the enterprise computing system:

receiving the second verification request and the end-user mobile number from the verification API;

sending a sign-in message to the end-user computing device, the sign-in message indicating a state of a second user verification session in the verification web-application on the verification computing system, the second user verification session being in communication with the verification agent and a second user web-application on the end-user computing device;

receiving, from the second user web-application, a second end-user authentication message in response to the sign-in message from the end-user computing device, the second end-user authentication message including the passkey to sign-in with the second user verification session;

sending, utilizing the second user web-application, an end-user verification message to the end-user computing device upon receiving the passkey; and in response to receiving a verification approved response from the second user web-application on the end-user computing device, sending the verification approved response to one or more of the end-user computing device or the enterprise computing system using the verification agent.

2. The method of claim 1, wherein sending the first-time sign-in request to the end-user computing device associated with the end-user mobile number includes sending the first-time sign-in request when the end-user mobile number is in a pre-enrollment list.

3. The method of claim 1, wherein one or more of the first-time sign-in request or the sign-in message is sent via Short Message Service (SMS) to the end-user mobile number of the end-user computing device.

4. The method of claim 1, wherein one or more of the first-time sign-in request or the sign-in message is sent via a push notification using the verification agent to the end-user computing device.

5. The method of claim 1, wherein one or more of the first-time sign-in request or the sign-in message is sent via an in-application notification using a client application on the end-user computing device, the in-application notification includes one or more of a popup window, an integrated sign-in, or a quick-response (QR) code.

6. The method of claim 1, wherein one or more of the first-time sign-in request or the sign-in message includes a hyperlink to a URL having a URL parameter indicating the state of a corresponding user verification session in the verification web-application for an end-user of the end-user computing device, and upon selection of the URL by the end-user, is configured to launch a corresponding user web-application via a browser program and display a verification interface via the browser program on the end-user computing device, the verification interface including a message requesting the end-user to sign-in to the corresponding user verification session; and the passkey is received upon a successful sign-in of the end-user computing device to the corresponding user verification session.

7. The method of claim 1, wherein receiving the first end-user authentication message in response to the first-time sign-in request from the end-user computing device includes sending a Silent Network Authentication (SNA) request to the end-user computing device, and the first end-user authentication message further including an SNA response.

8. The method of claim 1, wherein receiving the first end-user authentication message in response to the first-time sign-in request from the end-user computing device includes sending a short message service one time passcode (SMS-OTP) request to the end-user computing device, and the first end-user authentication message further including an OTP response.

9. The method of claim 1, wherein the second verification channel includes a verification application-programing-interface (API) request from a client application on the end-user computing device.

10. The method of claim 1, wherein the sign-in message is a first sign-in message; and the method further comprises receiving a third verification request and the end-user mobile number from the enterprise computing system;

sending a second sign-in message to the end-user computing device;

receiving a third end-user authentication message in response to the second sign-in message from the end-user computing device, the third end-user authentication message including the passkey.

11. A verification computing system comprising:
one or more processors; and
a storage subsystem including a verification agent, a verification web-application, and instructions operable by the one or more processors to
in a first verification channel including an offline channel in which a verification API (application programming interface) sends a first verification request in response to an input initiating an end-user verification on a first computing device of an enterprise computing system:
receive the first verification request and an end-user mobile number from the verification API,
send a first-time sign-in request to an end-user computing device associated with the end-user mobile number, the first-time sign-in request indicating a state of a first user verification session in the verification web-application, the first user verification session being in communication with the verification agent and a first user web-application on the end-user computing device,
receive, from the first user web-application, a first end-user authentication message after detecting a connection with the end-user computing device, the first end-user authentication message including a passkey, and in response, associating the passkey with the end-user mobile number,
in a second verification channel including an online channel in which the verification API sends a second verification request in response to a verification API request from a second computing device of the enterprise computing system:
receive the second verification request and the end-user mobile number from the verification API,
send a sign-in message to the end-user computing device, the sign-in message indicating a state of a second user verification session in the verification web-application, the second user verification session being in communication with the verification agent and a second user web-application on the end-user computing device,
receive a second end-user authentication message from the second user web-application on the end-user computing device, the second end-user authentication message including the passkey to sign-in with the second user verification session;
send, utilizing the second user web-application, an end-user verification message to the end-user computing device upon receiving the passkey, and
in response to receiving a verification approved response to the sign-in message from the second user web-application on the end-user computing device, send the verification approved response to one or more of the end-user computing device or the enterprise computing system using the verification agent.

12. The verification computing system of claim 11, wherein the instructions operable to send the first-time sign-in request to the end-user computing device associated with the end-user mobile number include instructions operable to send the first-time sign-in request when the end-user mobile number is in a pre-enrollment list.

13. The verification computing system of claim 11, wherein one or more of the first-time sign-in request or the sign-in message is sent via Short Message Service (SMS) to the end-user mobile number of the end-user computing device.

14. The verification computing system of claim 11, wherein one or more of the first-time sign-in request or the sign-in message is sent via an in-application notification using a client application on the end-user computing device, the in-application notification includes one or more of a popup window, an integrated sign-in, or a quick-response (QR) code.

15. The verification computing system of claim 11, wherein
the sign-in message includes
a hyperlink to a URL having a URL parameter indicating the state of the second user verification session for an end-user of the end-user computing device, and
upon selection of the URL by the end-user, is configured to launch the second user web-application via a browser program and display a verification interface via the browser program on the end-user computing device,
the verification interface including a message requesting the end-user to sign-in to the second user verification session.

16. The verification computing system of claim 11, wherein the instructions operable to receive the first end-user authentication message in response to the first-time sign-in request from the end-user computing device include instructions operable to send a Silent Network Authentication (SNA) request to the end-user computing device, and the first end-user authentication message further includes an SNA response.

17. A verification computing system comprising:
one or more processors; and
a storage subsystem comprising a verification agent, a verification web-application, and instructions operable by the one or more processors to
receive a list of new-users from a new account API on an enterprise computing system, each new-user having an end-user mobile number,
store a plurality of end-user mobile numbers from the list of new-users as a pre-enrollment list,
in a first verification channel in which a verification API (application programming interface) sends a first verification request that is initiated from a first computing device of the enterprise computing system:
receive the first verification request and an end-user mobile number associated with an end-user from the verification API,
send a first-time sign-in request to an end-user computing device associated with the end-user mobile number when the end-user mobile number is in the pre-enrollment list, the first-time sign-in request indicating a state of a first user verification session in the verification web-application, the first user verification session being in communication with the verification agent and a first user web-application on the end-user computing device,
receive, from the first user web-application, a first end-user authentication message after detecting a connection with the end-user computing device, the first end-user authentication message including a passkey, and in response, send a first end-user verification message to the end-user computing device utilizing the first user web-application,
in response to receiving a first verification approved response to the first end-user verification message from the first user web-application on the end-user computing device, send the first verification approved response to one or more of the end-user computing device or the enterprise computing system using the verification agent, in a second verification channel in which the verification API sends a second verification request that is initiated from a second computing device of the enterprise computing system, in response to receiving the second verification request, send a sign-in message to the end-user computing device, the sign-in message indicating a state of a second user verification session in the verification web-application, the second user verification session being in communication with the verification agent and a second user web-application on the end-user computing device, utilizing the second user web-application on the end-user computing device, receive a second verification approved response in response to a second end-user verification message, and send, using the verification agent, the second verification approved response to the verification API on the enterprise computing system.

18. The verification computing system of claim 17, wherein the instructions operable to send the first-time sign-in request comprise instructions operable to send the first-time sign-in request to the end-user computing device via one or more of Short Message Service (SMS), a push notification using the verification agent, or a client application on the end-user computing device.

19. The verification computing system of claim 17, wherein the instructions operable to receive the end-user authentication message in response to the first-time sign-in request from the end-user computing device include instructions operable to send a Short Message Service One-Time-Passcode (SMS-OTP) message to the end-user computing device, and the end-user authentication message further including a one-time-passcode response.

20. The verification computing system of claim 17, wherein the instructions operable to receive the end-user authentication message in response to the first-time sign-in request from the end-user computing device include instructions operable to send a Silent Network Authentication (SNA) request to the end-user computing device, and the end-user authentication message further including an SNA response.

* * * * *